(12) United States Patent
Mikame et al.

(10) Patent No.: US 8,552,115 B2
(45) Date of Patent: Oct. 8, 2013

(54) POWDER COATING MATERIAL AND FLUORINE-CONTAINING LAMINATE

(75) Inventors: Daisuke Mikame, Settsu (JP); Hiroshi Torii, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 313 days.

(21) Appl. No.: 12/934,940

(22) PCT Filed: Mar. 23, 2009

(86) PCT No.: PCT/JP2009/055640
§ 371 (c)(1),
(2), (4) Date: Sep. 27, 2010

(87) PCT Pub. No.: WO2009/119493
PCT Pub. Date: Oct. 1, 2009

(65) Prior Publication Data
US 2011/0027582 A1  Feb. 3, 2011

(30) Foreign Application Priority Data
Mar. 28, 2008 (JP) .................................. 2008-088162

(51) Int. Cl.
C08L 27/12 (2006.01)
C08L 77/00 (2006.01)
C08L 79/08 (2006.01)

(52) U.S. Cl.
USPC ............................ 525/123; 525/132; 525/178

(58) Field of Classification Search
None
See application file for complete search history.

(56) References Cited

U.S. PATENT DOCUMENTS 5,789,083 A     8/1998  Thomas
2004/0157068 A1  8/2004  Torii et al.

FOREIGN PATENT DOCUMENTS

| CN | 1714129 A | 12/2005 |
|----|-----------|---------|
| JP | 53-74532 A | 7/1978 |
| JP | 8-322732 A | 12/1996 |
| JP | 2005-335184 A | 12/2005 |
| JP | 2005-335186 A | 12/2005 |
| KR | 10-2005-0085072 A | 8/2005 |
| WO | 2004/048489 A1 | 6/2004 |

*Primary Examiner* — Ramsey Zacharia
(74) *Attorney, Agent, or Firm* — Sughrue Mion, PLLC

(57) ABSTRACT

The present invention provides a powder coating composition free from hexavalent chromium to serve as a binder component but having an adhesion comparable to that of the primer based on chromium phosphate even if baked at elevated temperature for a long time. The present invention is a powder coating composition which contains a macromolecule compound (A) having amide group and/or imide group, an antioxidizing material (B) and a fluororesin (C), wherein an average particle size of the macromolecule compound (A) is smaller than 50 μm.

9 Claims, No Drawings

POWDER COATING MATERIAL AND FLUORINE-CONTAINING LAMINATE

TECHNICAL FIELD

The present invention relates to a powder coating composition and a fluorine-containing laminate.

BACKGROUND ART

A coating composition prepared from a fluororesin has a wide range of uses in coating to form a fluororesin layer on a substrate of an article, which needs corrosion resistance, a non-stick property and heat resistance, such as a bread-baking mold, and a rice cooker. However, since the fluororesin is poor in adhesion to a substrate made of a metal, a ceramic or the like because of the non-stick property thereof, the substrate is coated with a primer having an affinity for both the fluororesin and the substrate in advance.

The fluororesin layer is generally required to be thickened in uses requiring corrosion resistance. In order to thicken the fluororesin layer, it is necessary to repeat coating of applying a powder coating composition comprising a fluororesin and baking the applied powder coating composition at temperatures not lower than the melting point of the fluororesin. The primer is required to have heat-resistant adhesion capable of withstanding the long-duration baking at elevated temperatures and maintaining adhesion to a substrate and the like.

As the primer excellent in heat-resistant adhesion, there has been widely adopted a primer based on chromium phosphate, having excellent resistance to long-duration baking at elevated temperatures, until today. However, since there is growing awareness of environmental issues, a development of a chromium-free primer, which does not contain hexavalent chromium but has a strong heat-resistant adhesion comparable to that of the primer based on chromium phosphate, has been strongly desired over the years.

As the chromium-free primer, a combination of a fluororesin and a various binder resin has been conventionally studied. As the binder resin, there was proposed the use of polyphenylene sulfide (PPS) from the viewpoint of heat resistance. However, PPS had a problem in that PPS was poor in compatibility with the fluororesin and adhesion to the fluororesin was insufficient.

In order to improve the adhesion to the fluororesin, it was proposed that polyamide-imide (PAI) and/or polyimide (PI) are/is added to PPS as the binder resin in the chromium-free primer (see, for example, Patent Document 1), in an example in this publication, PAI and PPS are used in a ratio of 1:15 to 1:20.

As the chromium-free primer using PPS and PAI as the binder resin, one using PAI and PPS in a ratio of 3:1 to 1:3 was also proposed (see, for example, Patent Document 2). However, this chromium-free primer has a feature in blending two kinds of fluororesins differing in melt viscosity each other in a specific ratio in order to provide a water-based primer capable of applying to a smooth surface, and there was a problem in that heat-resistant adhesion was deteriorated due to a long-duration baking.

As the binder resin of the chromium-free primer, one having PAI and PPS in a ratio of 1:1 is known (see, for example, Patent Document 3), but there was a problem in durability for hot water.

As a coating having a improved heat-resistant adhesion, a coating composition has also been proposed (for instance, see Patent Document 4) that comprises a macromolecule compound (A) containing amide group, and an anti-oxidizing material (B), wherein the anti-oxidizing material (B) accounts for 0.1 to 20% by mass of a total amount of the macromolecule compound (A) containing amide group and the anti-oxidizing material (B). Nonetheless, greater heat-resistant adhesion is still required.

Patent Document 1: Japanese Patent Application Publication No. S53-74532
Patent Document 2: U.S. Pat. No. 5,789,083
Patent Document 3: Japanese Patent Application Publication No. H08-322732
Patent Document 4: WO 2004/048489

DISCLOSURE OF INVENTION

Problems which the Invention is to Solve

In consideration of the above circumstances, it is an object according to the present invention to provide a powder coating composition free from hexavalent chromium to serve as a binder component but having an adhesion comparable to that of the primer based on chromium phosphate even if baked at elevated temperature for a long time.

The present invention is a powder coating composition which contains a macromolecule compound (A) having amide group and/or imide group, an anti-oxidizing material (B) and a fluororesin (C), wherein the macromolecule compound (A) has an average particle size of smaller than 50 μm.

The present invention is also a fluorine-containing laminate which comprises an article to be coated, a primer layer formed by the above powder coating composition on the article to be coated and a fluororesin layer formed on the primer layer.

The present invention is explained in detail next.

The powder coating composition according to the present invention contains a macromolecule compound (A) having amide group and/or imide group, an anti-oxidizing material (B) and a fluororesin (C), wherein the macromolecule compound (A) has an average particle size of smaller than 50 μm.

In the powder coating composition according to the present invention, the macromolecule compound (A) has the average particle size of smaller than 50 μm. As a result, the powder coating composition has superior processability during coating and excellent heat-resistant adhesion in terms of withstanding prolonged high-temperature baking.

In order to increase heat-resistant adhesion of a primer layer, it has been proposed to adjust a quantity ratio of a macromolecule compound and an anti-oxidizing material in a conventional powder coating composition. Meanwhile, the inventors have arrived at the present invention upon finding, by focusing on the particle size of the macromolecule compound (A), that using a powder coating composition having blended therein the macromolecule compound (A) within a specific particle size range allows improving heat-resistant adhesion of the primer layer, irrespective of the quantitative ratio of the macromolecule compound and the anti-oxidizing material.

The powder coating composition according to the present invention exhibits excellent heat-resistant adhesion irrespective of the quantitative ratio of the macromolecule compound (A) and the anti-oxidizing material (B). This allows reducing the influence, on a coating performance, of variability in the composition ratio of the macromolecule compound (A) and anti-oxidizing material (B) on account of a precision error in a balance that is used during charging of the starting materials in manufacture of the powder coating composition according to the present invention. A product having a stable coating film performance can be thus obtained. Also, a required coating film performance can be satisfied as well, even in case of a composition modification as mandated by market requirements, in terms of, for instance, compatibility with processing equipment or handleability. A wide composition adjustment margin is a further advantage of the powder coating composition according to the present invention.

The mechanism whereby the powder coating composition according to the present invention affords heat-resistant adhesion is not clear, but can be considered as follows. The macromolecule compound (A) of a restricted particle size has a smaller particle size than conventionally used macromolecule compounds. When the macromolecule compound (A) is used in a powder coating composition, therefore, substrate adhesion is enhanced through the increased contact area with the surface of an article to be coated. A contact area with the anti-oxidizing material (B) is likewise increased, and hence oxidative degradation of the macromolecule compound (A) can be prevented effectively, and heat-resistant adhesion can potentially be achieved as well to a degree not achievable in conventional cases.

Preferably, the macromolecule compound (A) has an average particle size of 45 µm or less, more preferably equal to or 40 µm or less. In terms of achieving superior heat-resistant adhesion, the lower limit of the average particle size is preferably 5 µm. The average particle size in this specification refers to a value that can be measured using a laser-diffraction particle size distribution analyzer.

Preferably, the anti-oxidizing material (B) accounts for 0.1 to 90% by mass, more preferably from 0.1 to 80% by mass, of a total amount of the macromolecule compound (A) and the anti-oxidizing material (B). When the content of the anti-oxidizing material (B) is excessively large, adhesion is likely to impair after a hot water treatment. When the content of anti-oxidizing material (B) is excessively low, adhesion is likely to impair after a thermal treatment.

More preferably, the content of anti-oxidizing material (B) is 30% by mass or more, still more preferably more than 30% by mass, particularly preferably 40% by mass or more, and most preferably more than 40% by mass, of the total amount of the macromolecule compound (A) and the anti-oxidizing material (B). More preferably, the content of anti-oxidizing material (B) is 70% by mass or less. When the content of anti-oxidizing material (B) lies within the above ranges, the oxidative-degradation preventing effect of the anti-oxidizing material (B) for the macromolecule compound (A) having a specific particle size is enhanced as a result.

Each component in the powder coating composition according to the present invention is explained in more detail next.

Macromolecule Compound (A)

The macromolecule compound (A) is preferably at least one compound selected from the group consisting of a polyamideimide (PAI), a polyamide, a polyamide acid (polyamic acid) and a polyimide, and is more preferably a PAI.

The PAI, the polyamide and the polyamide acid above are ordinarily a polymer having amide group (—NH—C(=O)—) in the main chain or side chain, and having an aromatic ring in the main chain.

The PAI is a polycondensate having amide group, an aromatic ring and imide group. The PAI is not particularly limited, and includes a compound having amide group introduced by oxidizing polyimide (PI), and the like in addition to a generally known PAI.

The above-mentioned polyamide is a polycondensate having an amide bond (—NH—C(=O)—) in the main chain. The polyamide is not particularly limited, and includes aliphatic polyamides such as nylon 6, nylon 66, nylon 11 and nylon 12, and aromatic polyamides such as poly(paraphenylene terephthalamide) and poly(metaphenylene isophthalamide), and the like.

The above-mentioned polyamide acid is a polycondensate having amide group, and carboxyl group or a derivative of carboxyl group (for instance, a derivative of carboxyl group through alkyl esterification). The polyamide acid is not particularly limited, and includes a polyamide acid having a molecular weight of several thousands to several tens of thousands, and the like.

The above-mentioned polyimide can be converted into the PAI or the polyamide acid through oxidation.

The polyimide can be converted into the PAI or the polyamide acid through introduction of amide group into the main chain by oxidation, during prolonged high-temperature baking of the coated powder coating composition according to the present invention. In the PAI, some of the imide groups in the main chain of PI remain unsubstituted by amide groups. In the polyamide acid, all the imide groups in the main chain of PI are substituted by amide groups and carboxyl groups.

A method of introducing amide group to PI is not particularly limited, and includes a method of ring-opening imide groups (imide rings) of PI through oxidation, a method of hydrolyzing imide groups (imide rings) of PI by action of an alkaline, and the like. In this specification, a site on a molecular structure for amide group to be introduced, for example, imide group to be converted to amide group by the oxidation as mentioned above may be referred to as an amide group-introducing site in some cases.

The macromolecule compound (A) has the average particle size of smaller than 50 µm. A commercially available powder having the above average particle size range can be used as the macromolecule compound (A). A finely pulverized micro-powder resulting from further milling may also be used. The powder used may be obtained by milling commercially available pellets. The milling method is not particularly limited, and may involve milling using a pelletizer, an atomizer or the like.

Anti-Oxidizing Material (B)

The anti-oxidizing material (B) can inhibit the above-mentioned oxidation of the amide group. The anti-oxidizing material (B) preferably has an oxidation-reduction potential lower than that of amide group, and nearly equal to or higher than that of imide group, and more preferably has an oxidation-reduction potential higher than that of imide group.

The anti-oxidizing material (B) is believed to delay oxidation of the amide groups through self-oxidation in preference to oxidation of the amide groups. For instance, a film is obtained by mixing a polyamideimide (PAI) (average particle size: 50 µm) and polyphenylene sulfide (PPS) (anti-oxidizing material (B), average particle size: 17 µm) in a 50/50 ratio, electrostatically coating the resulting mixture onto a steel foil to a film thickness of 100 µm, and baking at 350° C. for 30 minutes. The film is exposed in an atmosphere at 350° C. for 50 hours, after which a change in an infrared absorption intensity of the amide groups of the PAI is checked by surface infrared analysis of the film. The result shows that, after exposure to an atmosphere at 350° C. for 50 hours, the infrared absorption intensity of amide groups decreases significantly, vis-à-vis the absorption intensity during an early exposure stage, in a film manufactured in the same way, but with the PAI alone and no PPS mixed in. In the film having PPS, by contrast, the decrease in infrared absorption intensity of the amide groups is small, which suggests that oxidation of the amide groups can be delayed.

A material having a low oxidation state is presumably preferable as the anti-oxidizing material (B), in terms of eliciting sufficient inhibition of the oxidation of the amide groups. More preferably, the anti-oxidizing material (B) is a heat-resistant material. A heat-resistant anti-oxidizing material (B) is less likely to decompose or degrade even upon prolonged baking during coating of the powder coating composition according to the present invention. As a result, the heat-resistant anti-oxidizing material (B) makes for continued inhibition of the amide group oxidation and allows thus preserving the adhesion to the article to be coated that is elicited by the macromolecule compound (A).

The anti-oxidizing material (B) may have a reduction capability of reducing the oxidized amide group in addition to the self-oxidation capability of self-oxidizing in preference to the oxidation of the amide group.

The anti-oxidizing material (B) may also have a property of inhibiting oxidation of the article to be coated in addition to the above-mentioned property of inhibiting the oxidation of the amide group.

The anti-oxidizing material (B) includes a polyarylene sulfide (PAS); a nitrogen-containing compound; a metal such as tin, zinc and phosphorus; and sulfur.

The PAS is not particularly limited and includes polyphenylene sulfide ketone, polyphenylene sulfide sulfone, polybiphenylene sulfide and polyphenylene sulfide (PPS). In particular, PPS is suitably used. In case where the use of an amine and an elution of a metal ion are disfavored such as a semiconductor manufacturing process, PAS is preferably used. The PAS is a heat-resistant binder, and hence the PAS is suitably used for imparting not only oxidation resistance but also the heat-resistant adhesion, when the latter is required. The PAS is not particularly limited and includes polyphenylene sulfide ketone, polyphenylene sulfide sulfone, polybiphenylene sulfide and polyphenylene sulfide (PPS). In particular, PPS is suitably used.

As the anti-oxidizing material (B), the nitrogen-containing compound is also preferably used.

In this specification, the above-mentioned "nitrogen-containing compound" is one having nitrogen atom in the molecule, and can inhibit both of the oxidation of the amide group and the oxidation of the article to be coated.

The nitrogen-containing compound includes, for instance, an amine compound, a benzotriazole-based compound and a compound containing nitrogen and sulfur.

The amine compound is a compound having amino group, in which the amino group may form a salt such as a metallic salt. The amine compound is not particularly limited, but preferably includes an aromatic amine in that a high-temperature stability at a temperature of 250° C. or more is desired. As the aromatic amine, an amine having a phenyl group and/or a naphthyl group is preferable. The aromatic amine having a phenyl group and/or a naphthyl group is not particularly limited, and includes dinaphthylamine, phenyl-α-naphthylamine, phenyl-β-naphthylamine, diphenyl-p-phenylenediamine, phenylcyclohexyl-p-phenylenediamine and the like.

The benzotriazole-based compound is a compound having a chemical structure having benzotriazole as a base skeleton and being allowed to form a salt such as a metallic salt. The benzotriazole-based compound is not particularly limited and includes benzotriazole, 2-(2-hydroxy-5-methylphenyl)benzotriazole, 2-(2-hydroxy-5-tetraocthylphenyl)benzotriazole and the like.

The compound containing nitrogen and sulfur is a compound having nitrogen atom and sulfur atom and being allowed to form a salt such as a metal salt. The compound containing nitrogen and sulfur is not particularly limited, and includes a benzothiazole-based compound, a sulfenamide compound, thioureas and the like. The benzothiazole-based compound is not particularly limited as long as it is a compound having benzothiazole as a base skeleton, and includes 2-mercaptobenzothiazole, di-2-benzothiazole disulfide, 2-(N,N'-diethylthiocarbamoylthio) benzothiazole, di-2-benzothiazolyl disulfide and the like.

The sulfenamide compound is not particularly limited as long as it is a compound having sulfenamide group, and includes N,N'-cyclohexyl-benzothiazolyl-sulfenamide, N-tert-butyl-2-benzothiazolyl-sulfenamide, N-oxydiethylene-2-benzothiazolyl-sulfenamide, N,N'-dicyclohexyl-2-benzothiazolyl-sulfenamide, N,N'-diisopropylbenzothiazole-2-sulfene and the like. In this specification, the sulfenamide compound means one having a sulfenamide group and further having benzotriazole as a base skeleton in its structural part.

As the thioureas, preferred is thiourea in which a saturated or unsaturated hydrocarbon group having 1 to 6 carbon atoms may be substituted for at least one of the hydrogen atoms bonded to the nitrogen atoms. Such thioureas are not particularly limited and include N,N'-diethylthiourea, N,N'-dibutylthiourea, thiourea, N,N'-diphenylthiourea and the like.

In case where the article to be coated comprises an oxide film-fast-forming metal easy to form an oxide film, as the anti-oxidizing material (B), preferred is use of the nitrogen-containing compound, and in view of improving the adhesion to the article to be coated, preferred is use of the nitrogen-containing compound together with the PAS. The oxide film-fast-forming metal may be one easy to form the oxide film to the same extent as a stainless steel at least by baking at the time of coating with the powder coating composition according to the present invention or, as the article to be coated, one having the oxide film already formed at the time of applying the powder coating composition according to the present invention thereto. The above-mentioned oxide film-fast-forming metal includes the stainless steel and the like.

As the nitrogen-containing compound, benzothiazole-based compound is suitably used, and among the benzothiazole-based compound, a zinc-based antioxidant, which is a salt thereof with zinc, is suitably used.

In case where the article to be coated comprises an oxide film-slow-forming metal, as the anti-oxidizing material (B), the nitrogen-containing compound may be used, however does not necessary be used because there is not significant reduce in the adhesion to the article to be coated due to baking at the time of coating with the powder coating composition according to the present invention even if not using the nitrogen-containing compound. It meets the case to use one not necessarily having a property to inhibit the oxidation of the article to be coated but having the property to inhibit the oxidation of the amide group described above, and, for example, a use of only PAS may be allowed. In this specification, the above-mentioned oxide film-slow-forming metal is a metal slower in a rate of forming the oxide film than the stainless steel (for instance SUS304). The oxide film-slow-forming metal differs from the oxide film-fast-forming metal in that readiness for formation of oxide film is different. The oxide film-slow-forming metal includes aluminum, iron and the like.

The anti-oxidizing material (B) may be used in combination of one or more kinds thereof. When it is used in combination, the mass of the anti-oxidizing material (B) mentioned above is a total mass of all anti-oxidizing materials (B) combined.

The anti-oxidizing material (B) is preferably at least one species selected from the group consisting of the polyarylene sulfide and the nitrogen-containing compound.

When the PAS and another anti-oxidizing material are used in combination as the anti-oxidizing material (B), it is preferable to combine the PAS and another anti-oxidizing material so as to be in a ratio of 50:50 to 99:1. Another anti-oxidizing material includes one other than the PAS of anti-oxidizing materials (B) as mentioned above and, in particular, a nitrogen-containing compound is preferably used. Another anti-oxidizing material includes a nitrogen-containing compound, a metal such as tin, zinc and phosphorus, and sulfur.

The average particle size of the anti-oxidizing material (B) has preferably an upper limit of 200 μm and more preferably an upper limit of 150 μm. Within the above ranges, the average particle size of the anti-oxidizing material (B) can have preferably a lower limit of 0.01 μm, more preferably a lower limit of 0.1 μm. Preferably, the average particle size of the anti-oxidizing material (B) is relatively smaller than the average particle size of the fluororesin (C), and is more preferably 20 μm or less.

Fluororesin (C)

The powder coating composition according to the present invention has the fluororesin (C), and hence there can be formed, through coating, a coating film divided in a two-layer structure comprising a first layer (surface layer) having the fluororesin (C) as a main component, and a second layer having the macromolecule compound (A) and the anti-oxidizing material (B) as main components. When in the powder coating composition according to the present invention, which contains the fluororesin (C), a fluororesin layer (hereafter, also referred to as fluororesin layer (D)) comprising the fluororesin (D) is overlaid on the first layer, a coating film can be formed that has excellent adhesion to the fluororesin layer, depending on the compatibility between the fluororesin (D) and the fluororesin (C) in the first layer.

Although the coating film structurally separated into two layers is referred to as "structurally separated into two layers in structure" in this specification for convenience sake, actually, a concentration of the macromolecule compound (A) and the anti-oxidizing material (B) increases as it is closer to the article to be coated and the concentration of fluororesin (C), in place of the anti-oxidizing material (B), increases with distance from the article to be coated, and therefore it is considered that the fluororesin (C) is present in high concentration on the uppermost face of the coating film. Therefore, in the coating film, there may be cases where a kind of intermediate layer comprising the macromolecule compound (A) and the fluororesin (C) is present between a layer comprising the fluororesin (C) and a layer comprising the macromolecule compound (A) and the anti-oxidizing material (B), depending on the amount of each component blended.

In the powder coating composition according to the present invention, it is preferable that the fluororesin (C) is one having a baking temperature 300° C. or more at the time of baking. The baking temperature at the time of coating is not lower than a melting point of the fluororesin (C), generally.

The powder coating composition according to the present invention is hard to reduce in the adhesion to the article to be coated even after baked at a temperature of 300° C. or more for a long time of several tens hours. Although such an excellent heat-resistant adhesion could be conventionally provided only by using a chromium-based primer, the powder coating composition according to the present invention can perform an excellent heat-resistant adhesion even when using no chromium or a chromium compound.

The fluororesin (C) comprises a polymer obtained by polymerizing a monomer having fluorine.

The fluororesin (C) preferably comprises a fluorine-containing polymer obtained by polymerizing one or more kinds of fluorine-containing monomers selected from the group of fluorine-containing monomers consisting of chlorotrifluoroethylene (CTFE), trifluoroethylene, tetrafluoroethylene (TFE), hexafluoropropylene (HFP), vinylidene fluoride (VdF), and perfluoro(alkyl vinyl)ether (PAVE), and this fluorine-containing polymer may be obtained by copolymerizing the above-mentioned one or more kinds of the above-mentioned fluorine-containing monomers with one or more kinds of fluorine-free monomers selected from the group of fluorine-free monomers such as ethylene and propylene.

The fluororesin (C) comprising tetrafluoroethylene-based copolymer is more preferable in view of corrosion resistance.

In this specification, the above-mentioned "tetrafluoroethylene-based copolymer" is a polymer obtained by polymerizing TFE with the fluorine-free monomer and/or the fluorine-containing monomer other than TFE in the above-mentioned group of fluorine-containing monomers. As the fluorine-containing monomer other than TFE and the fluorine-free monomer, one or more kinds of the monomers, respectively, may be used.

The fluororesin (C) further preferably has a melting point of less than a baking temperature at the time of coating and heat resistance at the baking temperature.

As the fluororesin (C), a perfluororesin is preferably employed in the view of having both corrosion resistance and heat resistance.

The perfluororesin is a resin generally requiring a baking temperature of 300° C. or more, and includes a perfluoropolymer obtained by polymerizing a perfluoroolefin with perfluorovinylether and/or a trace comonomer. The perfluoroolefin is not particularly limited, and includes TFE, HFP and the like. The above-mentioned perfluorovinylether is not particularly limited, and includes perfluoro(methylvinylether), perfluoro(ethylvinylether), perfluoro(propylvinylether) and the like.

As the trace comonomer, there can be used one or more kinds of fluorine-free monomers and/or fluorine-containing monomers not being the perfluoroolefins nor perfluorovinylether as mentioned above. Preferably, a repeating unit derived from the trace comonomer in the molecular chain of the perfluoropolymer is less than 10 mol % of all monomer units of the perfluoropolymer.

As the fluororesin (C), a dispersion or powder obtained by emulsion polymerization or suspension polymerization can be employed and, in addition, a fine powder pulverized by milling can be employed.

Preferably, the average particle diameter in the case of using the fluororesin (C) in powder form is preferably in a range of 0.1 to 50 μm. When it is less than 0.1 μm, the fluororesin layer cannot be thickened so much, and when it exceeds 50 μm, a smoothness of the coating film obtained by coating with the powder coating composition according to the present invention may become poor in some cases. For a thin coat, a more preferable upper limit of the average particle diameter is 10 μm. For a lining having a film thickness exceeding 200 μm, a more preferable lower limit of the average particle diameter is 1 μm, a more preferable upper limit is 40 μm and a further preferable lower limit is 5 μm.

The mass of solid content of the fluororesin (C) ranges preferably from 50 to 90% by mass of a total amount of the macromolecule compound (A), the anti-oxidizing material (B) and the fluororesin (C). In case that the above-described powder coating composition is used as a primer, an adhesion between the primer layer and the fluororesin layer overlaid on the primer layer becomes readily impaired when the mass of solid content of the fluororesin (C) is below 50% by mass. Over 90% by mass, the adhesion between the coating film and the article to be coated tends to be poor. A more preferred lower limit is 60% by mass, and a more preferred upper limit is 85% by mass.

Additive and the Like

With a view to improving film formation ability and enhancing, for instance, the corrosion resistance of the coating film, the powder coating composition according to the present invention may also have blended therein, if required, a resin that has heat resistance at a temperature 200° C. and is none of the macromolecule compound (A), the anti-oxidizing material (B) or the fluororesin (C).

Another resin as mentioned above is not particularly limited, and includes a polyethersulfone resin, a polyether ether ketone resin and a polyether ketone resin. One or more kinds of these can be used.

The powder coating composition according to the present invention may contain an additive as required in order to improve the workability of application and properties of a coating film obtained from the powder coating composition.

The additive is not particularly limited, and includes an leveling agent, a solid lubricant, a pigment, a lustering agent, a filler, a pigment dispersant, an anti-settling agent, a water absorbent, a surface control agent, a thixotropic agent, a viscosity adjustor, an antigelling agent, an ultraviolet absorber, a light stabilizer, a plasticizer, an anti-flooding agent, an anti-skinning agent, a anti-scratch agent, a fungicide, an antibacterial agent, an anti-corrosion agent, an antistatic agent and a silane coupling agent.

In this specification, an anti-corrosion agent means one having a property of not inhibiting the oxidation of the amide group but inhibiting the oxidation of the article to be coated.

The powder coating composition according to the present invention can be prepared by mixing the macromolecule compound (A), the anti-oxidizing material (B) and the fluororesin (C), as well as an additive or the like added as desired, using mixing equipment. The mixing equipment is not particularly limited, and may be an ordinary V-type blender, a Henschel mixer or the like.

The powder coating composition according to the present invention can be suitably used as a primer. The primer is an undercoat composition that is applied onto the article to be coated before application of a topcoat composition.

The thickness of the primer layer obtained from the powder coating composition according to the present invention ranges preferably from 10 to 300 μm. The film thickness of 200 μm or more is easy to achieve.

The present invention is also a fluorine-containing laminate comprising an article to be coated; a primer layer formed by the above powder coating composition, on the article to be coated; and a fluororesin layer formed on the primer layer.

The primer layer is obtained by applying the powder coating composition according to the present invention onto the article to be coated.

The article to be coated is an object onto which the powder coating composition according to the present invention is to be applied. The article to be coated is not particularly limited, and may comprise, for instance, a metal such as aluminum or stainless steel (SUS); a heat-resistant resin; a ceramic or the like. Preferably, the article to be coated comprises a metal. As the metal, an elemental metal or an alloy metal may be used, and an oxide film-fast-forming metal such as a stainless steel, copper or a copper alloy may be used in view of good adhesion to the obtained coating film, and an oxide film-slow-forming metal such as aluminum or iron may be used.

The oxide film-fast-forming metal is easy to form an oxide coat film on its surface and this oxide coat film is considered to cause lowering adhesion to a coating film obtained by coating with the conventional powder coating composition. The powder coating composition according to the present invention can provide adequate adhesion to the coating film even if the article to be coated comprises the oxide film-fast-forming metal by using a material capable of inhibiting not only the oxidation of the amide group but also the oxidation of the article to be coated as the anti-oxidizing material (B).

The article to be coated is preferably subjected to a removal treatment of a resin component and to a surface roughening treatment before application of the powder coating composition, in order to increase the adhesion to the coating film obtained through application of the powder coating composition according to the present invention. The method for removing such a resin component may involve, for instance, using an organic solvent, an alkali or the like; or may involve decomposing the resin component at a temperature equal to or higher than 300° C. In terms of increasing the adhesion to the coating film obtained through application of the powder coating composition, and in terms of inhibiting delamination and achieving superior wear resistance, the article to be coated is suitably subjected to a surface preparation in which a thermal-sprayed layer is formed on a metallic substrate through thermal spraying of a metal powder and/or a ceramic powder, prior to the application of the above powder coating composition.

The primer layer can be formed on the article to be coated by applying the powder coating composition according to the present invention and baking, as desired, at 80 to 380° C. for 10 to 60 minutes.

The coating method used is, preferably, electrostatic spraying, application by fluidized bed coating or application by a Roto Lining process is preferably used.

As described above, although depending on melting points of the macromolecule compound (A), the anti-oxidizing material (B) and the fluororesin (C) in the powder coating composition according to the present invention, the baking is usually performed by heating the powder coating at temperatures not lower than a melting point of the fluororesin (C) for 10 to 60 minutes. The baking may be conducted prior to coating with a topcoat composition or may be conducted concurrently with baking of the topcoat composition at the time of baking after applying the topcoat composition, without baking before coating with the topcoat composition.

The fluororesin layer, which is formed on the primer layer, comprises preferably a fluororesin (D).

The surface of the primer layer formed by the powder coating composition according to the present invention on the article to be coated is rich in fluororesin (C). In terms of enhancing the adhesion to and compatibility with the surface of the primer layer, therefore, the fluororesin (D) that is used is preferably a fluororesin having the same composition, or a similar composition, to that of the fluororesin (C).

The fluororesin layer may comprise both the fluororesin (D) and the fluororesin (C), in terms of enhancing adhesion to the primer layer.

The adhesion between the primer layer obtained from the powder coating composition according to the present invention and the fluororesin layer can be improved by utilizing a resin comprising polymer having a terminal functional group as the fluororesin (C).

The terminal functional group is not particularly limited, and includes —COOR$^1$ (wherein R$^1$ represents a hydrogen atom, an alkyl group having 1 to 5 carbon atoms, or a perfluoroalkyl group having 1 to 3 carbon atoms), —COF, —CONH$_2$, —CH$_2$OH, —COOM$^1$, —SO$_4$M$^2$, —SO$_3$M$^3$ (wherein M$^1$, M$^2$ and M$^3$ are the same or different from one another and represent a I group atom or an atomic group capable of forming a univalent cation), and —$SO_4M^4_{1/2}$, —$SO_3M^5_{1/2}$ (wherein $M^4$ and $M^5$ are the same or different from one another and represent a II group atom, a transition metal such as iron or an atomic group capable of forming a divalent cation). The I group atom includes hydrogen atom, sodium atom, potassium atom and the like. The atomic group capable of forming a univalent cation includes ammonium group and the like. The II group atom includes calcium, magnesium and the like. The transition metal includes iron and the like.

Preferably, an amount of the terminal functional group ranges from 50 to 100000 per one million carbon atoms in a chain of a polymer molecule of the fluororesin (C). When this amount is less than 50, the adhesion is likely to reduce, and when it exceeds 100000, foaming during baking becomes much, resulting in easy causing defects of the coating film. With respect to the amount per one million carbon atoms in a chain of a polymer molecule of the fluororesin (C), a lower limit is more preferably 100, further 500 and an upper limit is more preferably 50000, further 10000.

The value of the above-mentioned amount of the terminal functional group is obtained by measuring with an infrared spectrophotometer.

The amount of the terminal functional group in a polymer having the terminal functional group can be generally adjusted by polymerizing with a catalyst, a chain transfer agent and a polymerization condition, each suitably selected.

The amount of the above-mentioned terminal functional group in a polymer having the terminal functional group can be increased by polymerizing a monomer having the above-mentioned functional group.

When a polymer of the fluororesin (C) obtained by polymerizing the monomer having the functional group as a monomer serves to a reaction with a reaction reagent such as acid or alkali appropriately or a treatment with heat, the (terminal) functional group converts in a part of the chemical structure due to the action of the reaction reagent or the heat.

The fluorine-containing laminate according to the present invention can be obtained by applying a topcoat composition, comprising the fluororesin (D), onto the primer layer obtained through application of the powder coating composition according to the present invention, with baking for 30 to 120 minutes at a temperature not lower than the melting point of the fluororesin (D).

As the topcoat composition comprising the fluororesin (D), a powder coating type or a liquid coating type is selectively used depending on a desired coating film thickness, and it is preferable to use the powder coating composition from the viewpoint of corrosion resistance (the viewpoint of thickening of the film thickness). For the topcoat composition comprising the fluororesin (D), a dispersion medium, a dispersant, an additive and another resin, which are the same as the powder coating composition according to the present invention, can be used.

The fluorine-containing laminate according to the present invention may be formed using a fluororesin film comprising the fluororesin (D), instead of the above-described topcoat composition.

The fluororesin (D) is preferably a perfluorinated resin, in view of thermal stability, coating processability (fluidity), and stain resistance (non-stick property) of the molded product. Preferably, the fluororesin (D) is a fluorinated tetrafluoroethylene/perfluoro(alkylvinyl)ether copolymer (PFA), or a fluorinated tetrafluoroethylene/hexaflouropropylene copolymer (FEP). Fluorination can be accomplished, for instance, by contacting the fluororesin with a fluorine-containing gas.

The fluororesin (D) may contain a filler or the like, with a view to improving the characteristics of the coating film. The filler is not particularly limited, and may be, for instance, a carbon fiber, a pigment, a lustering agent (mica or the like) or a glass powder.

The film thickness of the fluororesin layer (D) is not particularly limited, but is preferably 10 μm or more.

The powder coating composition according to the present invention can maintain adequate adhesion when the fluororesin layer (D) has a film thickness of 200 μm or more, and is particularly useful for lining processing in which a prolonged baking at elevated temperatures is required.

The uses of the fluorine-containing laminate according to the present invention are not particularly limited, and include: uses of coatings of various wires such as heat-resistant enamel wire because of its higher resistance to degradation due to processing in comparison with conventional PAI enamel wire; uses related to electric/electronics industries such as parts of information equipment (paper separating lug, printer guide, gear, bearing), connectors, burn-in sockets, IC sockets, electric parts for oil field, relays, shields of electromagnetic wave, relay cases, switches, covers and buses of a terminal block;

uses related to machinery industries such as valve seats, seals for hydraulics, back-up rings, piston rings, wear bands, vanes, ball bearing retainers, rollers, cams, gears, bearings, labyrinth seals, pump parts, mechanical links, bushings, fasteners, spline liners, brackets, hydraulic pistons, chemical pump casings, valves, tower packing, coil bobbins, packing, connectors, gaskets and valve seals;

uses related to vehicles industries such as thrust washers, seal rings, gears, bearings, tappets, engine components (piston, piston ring, valve stir), transmission components (spool valves, ball check valve, sealant) and rocker arms;

and uses related to aerospace industries such as jet engine parts (bushing, washer, spacer, nut), power control clutches, bearings for door hinges, connectors, tube clamps, brackets, hydraulic components, antennas, radomes, frames, parts of fuel system, compressor parts, rocket engine components, wear strips, connector shelves and space structures. In addition to these uses, uses such as pin covers of a can making machine, parts for plating equipment, parts related to an atomic energy, ultrasonic transducers, potentiometer shafts and parts of hydrants are given.

Further uses of the fluorine-containing laminate according to the present invention include, for example, uses for corrosion resistance of mixer blades, tank inner surfaces, vessels, towers, centrifugal separators, pumps, valves, piping, heat exchangers, plating jigs, tank inner surfaces of the tank trucks and screw conveyors; uses related to a semiconductor such as ducts of a semiconductor factory; uses for industrial release such as rolls for office automation, belts for office automation, papermaking rolls, calendering rolls for producing a film and injection molds; uses related to household electrical appliances and kitchen appliances such as rice cookers, pots, hot plates, flatirons, fry pans, bread makers, bread baking trays, tops of gas cookers, bread baking sheets, skillets and kettles; uses related to industrial parts such as sliding members of a precision mechanism including various gears, papermaking rolls, calendering rolls, mold releasing parts, casings, valves, packing, coil bobbins, oil seals, fittings, antenna caps, connectors, gaskets, valve seals, buried bolts and buried nuts.

Effects of the Invention

Because of the above features, the powder coating composition according to the present invention is hard to reduce adhesion even upon prolonged baking at elevated temperature during coating, and affords hence a fluorine-containing laminate having a heat-resistant adhesion comparable to that of chromium phosphate primers.

BEST MODES FOR CARRYING OUT THE INVENTION

The following examples illustrate the present invention in detail. These examples are, however, by no means limitative of the scope of the invention.

Example 1

A polyamideimide resin (product name: TORLON 4000T-40, by Solvay Advanced Polymers K.K) (PAI) was milled using a mill (trade name: ATOMIZER, manufactured by Dalton Corporation) to yield a PAI-particle milled product having an average particle size of 36 μm. Next, 70 g of the resulting PAI-particle milled product, 400 g of a tetrafluoroethylene/perfluoro(alkyl vinyl)ether copolymer (PFA) (melting point: 310° C., average particle diameter: 25 μm) and 30 g of a polyphenylene sulfide resin (PPS) (trade name: RYTON V-1, by Phillips Petroleum Co., average particle size: 17 μm) were homogeneously dispersed using a mixer (trade name: V Type blender, by Dalton Corporation) to prepare the powder coating composition according to the present invention.

The powder coating composition was electrostatically applied, to a film thickness of 100 μm, onto an iron sheet (SS400, 100 mm long×50 mm wide×1.5 mm thick, average roughness (Ra)=2 to 3 μm), which had been treated at a blast pressure of 1.0 MPa by abrasive blast with aluminum powder (trade name: TOSA EMERY #40, by Ujiden Chemical Industry Co., Ltd.). The applied powder coating composition was baked at 350° C. for 30 minutes. A PFA powder coating composition (average particle size: 220 μm, melt flow rate: 6 g/10 minutes) was overlaid on the resulting dried coat film of the powder coating composition, so as to yield a total film thickness after baking of 1.1 mm, and was baked at 350° C. for one hour, to yield the laminate A.

Test pieces were cut from the obtained laminate A, and were evaluated as described below.

Heat Resistance Test

The test piece on which lines were cut out in the width of 10 mm was put in an electric oven set at 350° C. and heated for 20 hours, 30 hours or 50 hours and, then, was cooled to room temperature, and a peel strength was measured in the direction of a 90° angle with respect to the test piece at a tensioning speed of 50 mm/min with a Tensilon universal tester in accordance with JIS K 6854-1 (1999). However, when the coat film of the test piece was peeled off after the heating, the peel strength was taken as 0 kgf/cm.

Hot-Water Treatment Resistance Test

The Test piece having 10 mm-wide cuts was immersed in hot water at 98° C. for 24 hours, 72 hours or 120 hours, after which the test piece was cooled to room temperature. The peel strength of the test piece was measured in the 90° direction in the same way as in the heat resistance test.

Evaluation of State of Peeling

In the test of the peel strength, the state of peeling was observed and evaluated as follows.
/A: Peeling between the article to be coated and the baked coating film of the powder coating composition (substrate peeling)
/B: Peeling between the baked coating film of the powder coating composition and the PFA resin layer (delamination)
/C: Peeling due to breakage of the baked coating film of the powder coating composition (cohesive failure)

Example 2

The laminate B was prepared and evaluated in the same way as in Example 1, except that the amount of PAI was changed to 60 g, and the amount of PPS to 40 g.

Example 3

The laminate C was prepared and evaluated in the same way as in Example 1, except that the amount of PAI was changed to 50 g, and the amount of PPS to 50 g.

Example 4

The laminate D was prepared and evaluated in the same way as in Example 1, except that the amount of PAI was changed to 40 g, and the amount of PPS to 60 g.

Example 5

The laminate E was prepared and evaluated in the same way as in Example 1, except that the amount of PAI was changed to 30 g, and the amount of PPS to 70 g.

Example 6

The laminate F was prepared and evaluated in the same way as in Example 1, except that the amount of PAI was changed to 10 g, and the amount of PPS to 90 g.

Example 7

The laminate G was prepared and evaluated in the same way as in Example 1, except that there was used a stainless steel substrate (SUS304, 100 mm long×50 mm wide×1.5 mm thick, average roughness (Ra)=2 to 3 μm), treated by abrasive blast with the same alumina powder used in Example 1, in lieu of the iron substrate employed in Example 1.

Example 8

The laminate H was prepared and evaluated in the same way as in Example 1, except that the amount of PAI was changed to 60 g, and a mixture of 1.0 g of a benzothiazole compound (2-mercaptobenzothiazole zinc salt) and 40 g of PPS was used instead of 40 g of PPS, as the anti-oxidizing material.

Example 9

The laminate I was prepared and evaluated in the same way as in Example 1, except that the amount of PFA was changed to 233.3 g.

Comparative Example 1

A polyamideimide resin (product name: TORLON 4000T-40, by Solvay Advanced Polymers (PAI) was milled with a mill (trade name: ATOMIZER, manufactured by Dalton Corporation) to yield a PAI-particle milled product having an average particle size of 50 μm. The comparative laminate a was prepared and evaluated in the same way as in Example 1, except that there was used 50 g of the obtained PAI-particle milled product and 50 g of PPS.

Results are given in Tables 1 and 2. In the tables, /A, /B, and /C are the above-described evaluation of state of peeling.

TABLE 1

|  | PAI particle size | PAI/PPS ratio | Peel strength [kgf/cm] | | | |
|---|---|---|---|---|---|---|
|  |  |  | Before testing | Heat resistance test (350° C.) | | |
|  |  |  |  | 20 hours | 30 hours | 50 hours |
| Example 1 | 36 μm | 70/30 | 10.6/C | 13.0/C | 12.7/C | 10.3/C |
| Example 2 | 36 μm | 60/40 | 12.3/C | 14.2/C | 14.7/C | 13.6/C |
| Example 3 | 36 μm | 50/50 | 11.5/C | 13.8/C | 14.2/C | 13.5/C |
| Example 4 | 36 μm | 40/60 | 11.7/C | 13.6/C | 14.5/C | 13.5/C |
| Example 5 | 36 μm | 30/70 | 11.1/C | 10.2/C | 10.0/C | 9.7/C |
| Example 6 | 36 μm | 10/90 | 10.8/C | 10.0/C | 10.0/C | 9.0/C |
| Example 7 | 36 μm | 70/30 | 12.2/C | 13.5/C | 14.4/C | 14.3/C |
| Example 8 | 36 μm | 60/40 | 11.3/C | 11.8/C | 13.0/C | 13.2/C |
| Example 9 | 36 μm | 70/30 | 10.6/C | 11.2/C | 11.8/C | 11.4/C |
| Comp. Ex. 1 | 50 μm | 50/50 | 7.7/C | 8.5/C | 9.0/C | 8.5/C |

TABLE 2

|  | PAI particle size | PAI/PPS ratio | Peel strength [kgf/cm] | | | |
|---|---|---|---|---|---|---|
|  |  |  | Before testing | Heat resistance test (98° C.) | | |
|  |  |  |  | 24 hours | 72 hours | 120 hours |
| Example 1 | 36 μm | 70/30 | 10.5/C | 12.5/C | 11.6/C | 10.8/C |
| Example 2 | 36 μm | 60/40 | 12.2/C | 12.0/C | 11.8/C | 11.6/C |
| Example 3 | 36 μm | 50/50 | 11.4/C | 11.2/C | 11.6/C | 11.5/C |
| Example 4 | 36 μm | 40/60 | 11.5/C | 11.3/C | 11.6/C | 11.8/C |
| Example 5 | 36 μm | 30/70 | 10.9/C | 10.1/C | 9.5/C | 9.4/C |
| Example 6 | 36 μm | 10/90 | 10.8/C | 9.7/C | 7.8/C | 5.8/C |
| Example 7 | 36 μm | 70/30 | 12.6/C | 10.7/C | 11.1/C | 13.1/C |
| Example 8 | 36 μm | 60/40 | 11.1/C | 10.8/C | 10.0/C | 9.6/C |
| Example 9 | 36 μm | 70/30 | 10.7/C | 10.6/C | 10.0/C | 9.5/C |
| Comp. Ex. 1 | 50 μm | 50/50 | 7.6/C | 6.1/C | 2.4/A | 2.2/A |

As shown in table 1, Examples 1 to 9 exhibit the excellent heat-resistant adhesion, in that they suffer no drop of the peel strength after the heat resistance test.

The results of the comparative example 1 show that the peel strength before testing is poorer when large-particle PAI is used than when fine-particle PAI is used. In particular, there is a significant drop in the peel strength after the hot-water resistance test when large-particle PAI is used.

Thus, the powder coating composition according to the present invention exhibited excellent performance during a prolonged high-temperature thermal treatment, as well as superior resistance to hot water.

INDUSTRIAL APPLICABILITY

Because of the above features, the powder coating composition according to the present invention allows obtaining a coating film having an excellent heat resistance, and can thus be suitably used as a coating for forming a primer layer that must exhibit high heat-resistant adhesion.

The invention claimed is:

1. A powder coating composition which contains a macromolecule compound (A) having amide group and/or imide group, an anti-oxidizing material (B) and a fluororesin (C),
   wherein said macromolecule compound (A) has an average particle size of 45 μm or less,
   wherein the macromolecule compound (A) is at least one compound selected from the group consisting of a polyamideimide, a polyamide, a polyamide acid and a polyimide,
   wherein the anti-oxidizing material (B) is at least one compound selected from the group consisting of a polyarylene sulfide, an amine compound, a benzotriazole-based compound, a benzothiazole-based compound, a sulfenamide compound, and a thiourea compound,
   wherein the fluororesin (C) is a perfluororesin.

2. The powder coating composition according to claim 1, wherein the anti-oxidizing material (B) accounts for 0.1 to 80% by mass of a total amount of the macromolecule compound (A) and the anti-oxidizing material (B).

3. The powder coating composition according to claim 1, wherein the macromolecule compound (A) is a polyamideimide.

4. The powder coating composition according to claim 1, wherein the anti-oxidizing material (B) is a polyarylene sulfide.

5. The powder coating composition according to claim 1, wherein the anti-oxidizing material (B) is an amine compound, a benzotriazole-based compound, a benzothiazole-based compound, a sulfenamide compound, or a thiourea compound.

6. The powder coating composition according to claim 1, wherein the anti-oxidizing material (B) is a polyarylene sulfide, and an amine compound, a benzotriazole-based compound, a benzothiazole-based compound, a sulfenamide compound, or a thiourea compound.

7. The powder coating composition according to claim 1, wherein the mass of solid content of the fluororesin (C) accounts for 50 to 90% by mass of the total amount of the macromolecule compound (A), the anti-oxidizing material (B) and the fluororesin (C).

8. The powder coating composition according to claim 1, wherein the fluororesin (C) is a tetrafluoroethylene/perfluoro(alkylvinyl ether) copolymer.

9. The powder coating composition according to claim 1, which is a primer.

* * * * *